E. A. TRANSMEIER.
COMBINED BARROW AND SCRAPER.
APPLICATION FILED JULY 16, 1921.

1,425,424.

Patented Aug. 8, 1922.
2 SHEETS—SHEET 1.

WITNESSES
Leo Hayes

E. A. Transmeier INVENTOR
BY Victor J. Evans
ATTORNEY

E. A. TRANSMEIER.
COMBINED BARROW AND SCRAPER.
APPLICATION FILED JULY 16, 1921.
1,425,424.
Patented Aug. 8, 1922.
2 SHEETS—SHEET 2.
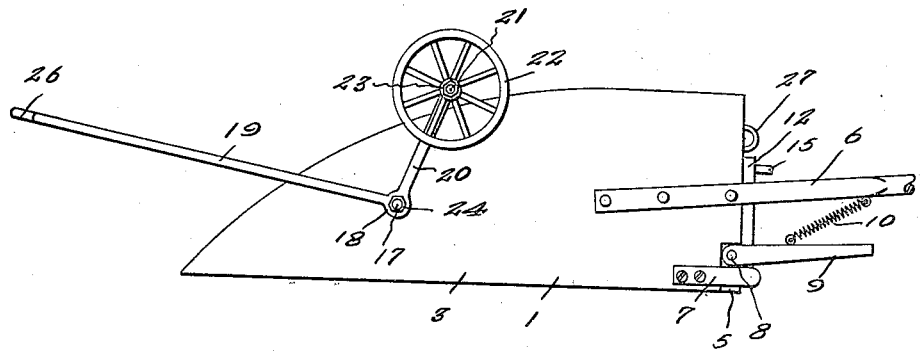
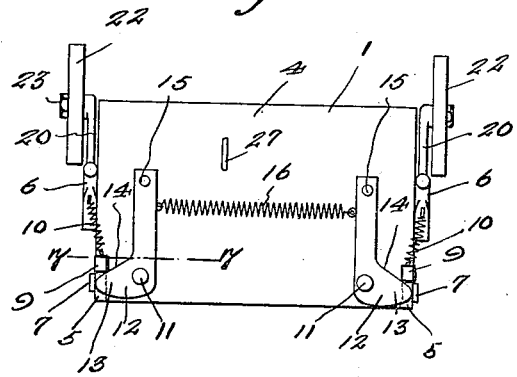
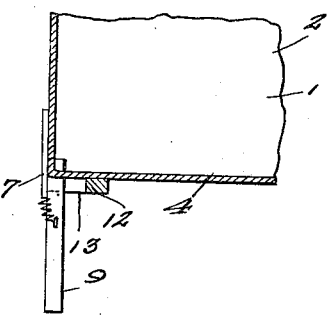
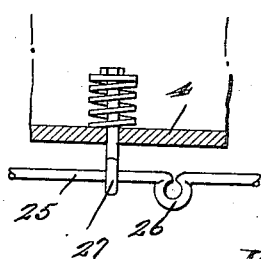
E. A. Transmeier INVENTOR
BY *Victor J. Evans*
ATTORNEY
WITNESS:

UNITED STATES PATENT OFFICE.

ERNEST A. TRANSMEIER, OF LAWRENCE, KANSAS.

COMBINED BARROW AND SCRAPER.

1,425,424.  Specification of Letters Patent.  Patented Aug. 8, 1922.

Application filed July 16, 1921. Serial No. 485,344.

*To all whom it may concern:*

Be it known that I, ERNEST A. TRANSMEIER, a citizen of the United States, residing at Lawrence, in the county of Douglas and State of Kansas, have invented new and useful Improvements in Combined Barrows and Scrapers, of which the following is a specification.

My present invention has reference to a combined wheel barrow and road scraper.

My object is to produce a device of this character that comprises a body having handles at its rear and closed end and which may be supported upon wheels that are trunnioned on a bail which is normally latched to the body and also supported on legs which are pivoted and also latched on the body, said bail being susceptible to a swinging movement on its pivots whereby the same is arranged outwardly of the body and the wheels carried thereby elevated above the bottom of the body, so that draft animals may be attached to the bail, while, when the latches for the legs are released, spring means force the same above the bottom of the body, and thus produce in a comparatively simple, cheap and thoroughly efficient manner a combined road scraper and wheel barrow.

Other objects and advantages will present themselves as the nature of the invention is better understood, reference being had to the drawings which accompany and which form part of this specification.

In the drawings:—

Figure 4 is a sectional view on the line 4—4 of Figure 2.

Figure 5 is a side elevation showing the improvement in the nature of a scraper.

Figure 6 is a rear end view thereof.

Figure 7 is a sectional view on the line 7—7 of Figure 6.

Figure 1:
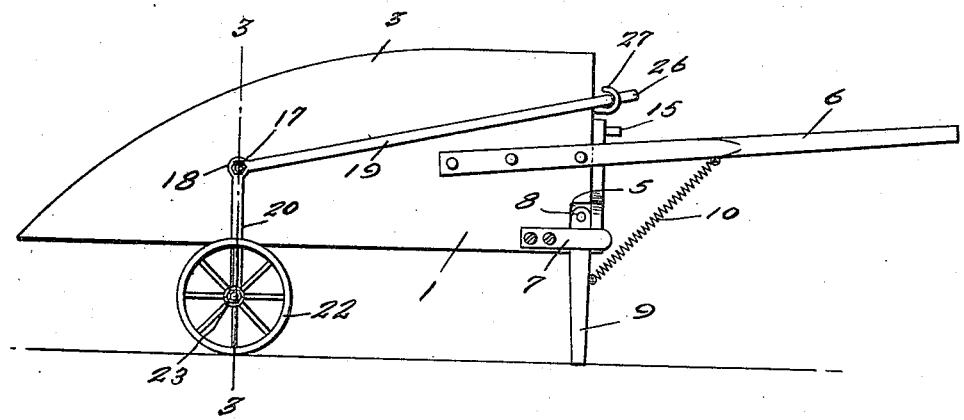
Figure 1 is a side elevation of the improvement showing the same in the nature of a wheel barrow.
Figure 2:
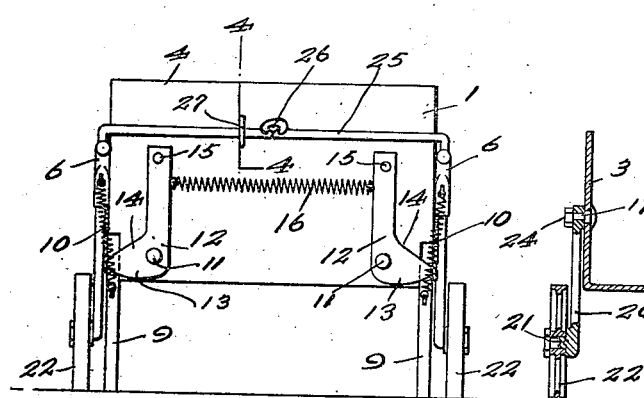
Figure 2 is a rear end view thereof.
Figure 3:
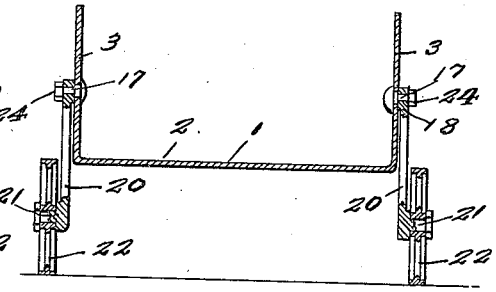
Figure 3 is a sectional view on the line 3—3 of Figure 1.

The body 1 of my improvement is of the shape or type ordinarily employed on road scrapers and wheel barrows, the same comprising a flat bottom 2 having sides 3 and an end 4. The sides 3 have their upper edges rounded to the front and open end of the body, and the said sides, at the rear and closed end of the body are provided with vertical notches or depressions 5. Above the depressions there are secured to the sides, the rearwardly extending handles 6, and the depressions are partly covered by plates 7 that are secured or which may be integrally formed with the sides 3.

Pivoted, as at 8, in each of the depressions 5 is a leg member 9. Between each leg and each handle there is secured a spring 10, the said springs normally swinging the legs in the direction of the handles to hold the said legs above the bottom surface of the body.

Pivotally secured, as at 11, on the rear end 4 of the body, opposite each of the depressions 5, is a latch member 12. Each latch includes a straight body portion and a lower offset active portion 13. The active end of each of the dogs has its upper surface arranged at an angle, as indicated by the numeral 14. The body or straight portions of each of the latches 12 has an outstanding knob 15, and the knob end of the latches are influenced toward each other by a spring 16 which is secured to the said latch members. Thus the active ends of the latches are normally brought over the depressions 5 and are in contacting engagement with the plates 7 so that the legs 9 are effectively supported against movement in any direction in the depressions 5, and consequently the legs are in a position to effectively support the body 1. To release the legs, that is to bring the legs to inactive position, as when the device is employed as a scraper, a pressure upon the knobs 15 away from each other is exerted, bringing the active ends of the latches out of contacting engagement with the rear edges of the legs. The springs force the legs toward the handles, and the legs rest upon the angle edges of the active portions of the latches. It will be apparent that the legs are thus effectively supported in a substantially horizontal position, and it will be further apparent that a downward pressure upon the legs will cause the same to ride on the angle edges of the enlarged or active ends of the latches to cause the latches to be swung upon their pivots out of contacting engagement with the legs, and thus permit the legs to be again seated and retained in the depressions without necessitating the operator engaging the latches.

Adjacent to the front end of the body, the sides 3 thereof are provided with oppositely directed outstanding trunnions 17. These trunnions provide bearings for the eye portions 18 of a bail 19. The arms of the bail, from the eyes 18 thereof have angle extensions, which are normally projected outwardly from the body 1. These extensions are indicated by the numeral 20, and have at their ends outstanding portions 21 which provide journals for wheels 22. Suitable means, 23 and 24 respectively, are provided for retaining the wheels on their axles and the eyes of the bails on the trunnions 17.

The bail is of a length whereby the same may be swung over the sides and over the rear end 4 of the body 1. For distinction, the end of the bail connecting the sides thereof is indicated by the numeral 25, the said end 25 being centrally twisted upon itself or otherwise formed with an eye 26 whereby a hook connected to the single or double trees for the draft animal may be attached thereto, when the bail is swung outwardly over the body and by virtue of such swinging the wheels 22 are elevated above the bottom of the body. On the rear end 4 of the body there is a spring influenced catch 27 that normally engages the portion 25 of the bail to hold the same firmly on the body and the wheels 22 in position to contact with the road surface. The release of this catch permits of the operator swinging the bail so that the same can be attached to the draft animals, and it is believed that the foregoing description, when taken in connection with the drawings will amply set forth the construction, operation and advantages of the improvement to those skilled in the art to which such inventions relate.

Having described the invention, I claim:—

1. In a combined barrow and scraper, a body having a handle at the rear and closed end thereof, legs pivotally supported at the said rear end of the body, spring means influencing the legs above the bottom of the body, latching means holding the legs vertically and depending below the bottom of the body, a bail having its arms journaled on the sides of the body and having extensions from the said sides provided with axles and wheels mounted on said axles, said bail being of a length to straddle the sides and closed end of the body, a spring influenced catch at the said rear end of the body for holding the bail thereon.

2. In a combined wheel barrow and road scraper, a body, legs pivoted in depressions at the rear corners of the body, plates on the sides of the body disposed over the depressions, handles on the body, spring means between the legs and handles for influencing the legs in the direction of the handles, pivoted latches on the rear end of the body having angle active faces, spring means influencing the latches to bring said active faces over the depressions and the ends of the latches in contacting engagement with the plates, whereby to hold the legs in the depressions and in a position to support the body, a bail straddling the rear end and the sides of the body and having its sides journaled on the body, said bail having depending portions provided with offsets forming axles, wheels journaled on said axles, an eye on the connecting portion for the arms of the bail, and a spring influenced catch on the rear of the body for engaging the said portion of the bail for holding the wheels below the bottom of the body in ground contacting engagement, and said wheels designed, when the catch is released and the bail is swung outwardly from the body to be elevated above the bottom of the body.

In testimony whereof I affix my signature.

ERNEST A. TRANSMEIER.